United States Patent
Mallick et al.

(10) Patent No.: US 10,750,566 B2
(45) Date of Patent: Aug. 18, 2020

(54) DETERMINING TO TRANSITION TO A CONNECTED STATE

(71) Applicant: Motorola Mobility LLC, Chicago, IL (US)

(72) Inventors: Prateek Basu Mallick, Langen (DE); Ravi Kuchibhotla, Clarendon Hills, IL (US); Joachim Loehr, Wiesbaden (DE)

(73) Assignee: Motorola Mobility LLC, Chicago, IL (US)

( * ) Notice: Subject to any disclaimer, the term of this patent is extended or adjusted under 35 U.S.C. 154(b) by 267 days.

(21) Appl. No.: 15/498,756

(22) Filed: Apr. 27, 2017

(65) Prior Publication Data
US 2018/0317110 A1 Nov. 1, 2018

(51) Int. Cl.
| | | |
|---|---|---|
| H04W 76/27 | (2018.01) | |
| H04W 76/19 | (2018.01) | |
| H04W 24/10 | (2009.01) | |
| H04W 72/04 | (2009.01) | |
| H04L 5/00 | (2006.01) | |
| H04L 12/26 | (2006.01) | |
| H04W 48/10 | (2009.01) | |

(52) U.S. Cl.
CPC ........... *H04W 76/27* (2018.02); *H04L 5/0048* (2013.01); *H04L 43/16* (2013.01); *H04W 24/10* (2013.01); *H04W 72/042* (2013.01); *H04W 76/19* (2018.02); *H04W 48/10* (2013.01)

(58) Field of Classification Search
CPC ..... H04W 76/27; H04W 76/10; H04W 76/19; H04W 76/20
See application file for complete search history.

(56) References Cited

U.S. PATENT DOCUMENTS

| | | | | |
|---|---|---|---|---|
| 2012/0147830 A1* | 6/2012 | Lohr | ................... | H04W 72/042 370/329 |
| 2013/0029588 A1* | 1/2013 | Bienas | ................... | H04W 48/18 455/7 |
| 2014/0348020 A1* | 11/2014 | Tenny | ................... | H04W 68/00 370/252 |

(Continued)

FOREIGN PATENT DOCUMENTS

| | | |
|---|---|---|
| WO | 2013135287 A1 | 9/2013 |
| WO | 2013156687 A1 | 10/2013 |

(Continued)

OTHER PUBLICATIONS

PCT/US2018/029851, "Notification of Transmittal of the International Search Report and the Written Opinion of the International Searching Authority, or the Declaration", International Searching Authority, dated Jul. 12, 2018, pp. 1-14.

*Primary Examiner* — Ashley Shivers
(74) *Attorney, Agent, or Firm* — Kunzler Bean & Adamson (57) ABSTRACT

Apparatuses, methods, and systems are disclosed for determining to transition to a connected state. One apparatus includes a processor that determines whether to transition to a connected state for receiving system information based on a parameter associated with the system information. The apparatus includes a transmitter that transmits information that initiates a transition to the connected state in response to determining to transition to the connected state.

14 Claims, 6 Drawing Sheets

(56) References Cited

U.S. PATENT DOCUMENTS

| | | | |
|---|---|---|---|
| 2015/0118993 A1* | 4/2015 | Rune | H04W 12/08 455/410 |
| 2015/0156799 A1* | 6/2015 | Hapsari | H04W 74/08 370/329 |
| 2016/0081029 A1* | 3/2016 | Wang | H04W 4/70 455/574 |
| 2016/0150481 A1* | 5/2016 | Tofighbakhsh | H04W 52/0251 370/311 |
| 2017/0055294 A1* | 2/2017 | Lee | H04W 74/0833 |
| 2019/0174554 A1* | 6/2019 | Deenoo | H04W 80/02 |

FOREIGN PATENT DOCUMENTS

| | | |
|---|---|---|
| WO | 2015019180 A2 | 2/2015 |
| WO | 2016095820 A1 | 6/2016 |

* cited by examiner

DETERMINING TO TRANSITION TO A CONNECTED STATE

FIELD

The subject matter disclosed herein relates generally to wireless communications and more particularly relates to determining to transition to a connected state.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, some system information may be transmitted and/or received more often than is necessary. In certain configurations, to reduce the signaling load for providing system information, a minimum amount of system information may be used. The minimum system information ("SI") may contain basic information for initial access to the cell (e.g., subframe number, list of public land mobile networks ("PLMNs"), cell camping parameters, RACH parameters) that is broadcast periodically in a cell. In some configurations, the other non-minimum SI doesn't necessarily need to be periodically broadcast (e.g., it may be a network decision). In various configurations, the other SI may be provided on-demand to UEs (e.g., a UE may request it). Delivery of other SI may be done in a broadcast or unicast manner. In some configurations, the minimum SI may indicate whether a specific SIB is periodically broadcasted or provided on-demand. To obtain the one or more SIBs which are not periodically broadcasted and are provided on-demand, a UE may initiate an on-demand SI acquisition procedure (e.g., SI request). For an SI used by the UE, the UE may determine whether it is available in the cell and whether it is broadcast or not before it sends a request for it. The scheduling information for other SI may be provided by the minimum SI (e.g., an SIB type, validity information, periodicity, SI-window information, etc.).

In various configurations, system information may be received inefficiently while a UE is in an inactive state. The inefficiency may be that the UE uses different resources and/or that receiving the system information takes too long.

BRIEF SUMMARY

Apparatuses for determining to transition to a connected state are disclosed. Methods and systems also perform the functions of the apparatus. In one embodiment, the apparatus includes a processor that determines whether to transition to a connected state for receiving system information based on a parameter associated with the system information. In certain embodiments, the apparatus includes a transmitter that transmits information that initiates a transition to the connected state in response to determining to transition to the connected state.

In one embodiment, the parameter associated with the system information includes a radio characteristic, a volume of system information, particular system information, or some combination thereof. In certain embodiments, the system information includes pathloss or other measurements over one or more downlink reference signals. In various embodiments, the processor determines to transition to the connected state in response to the radio characteristic being below a predetermined threshold and to remain in an inactive state in response to the radio characteristic being above the predetermined threshold. In some embodiments, the predetermined threshold is configured by minimum system information.

In certain embodiments, the processor determines to transition to the connected state in response to the volume of system information being above a predetermined threshold and to remain in an inactive state in response to the volume of system information being below the predetermined threshold. In some embodiments, the volume of system information corresponds to a number of system information blocks, a number of system information messages, or some combination thereof. In various embodiments, the processor determines to transition to the connected state in response to the particular system information indicating system information blocks that are to be delivered in the connected state.

A method for determining to transition to a connected state, in one embodiment, includes determining whether to transition to a connected state for receiving system information based on a parameter associated with the system information. In various embodiments, the method includes transmitting information that initiates a transition to the connected state in response to determining to transition to the connected state.

In one embodiment, an apparatus includes a processor that: determines a time to wait to receive system information; and determines whether to transition to a connected state based on the time. In various embodiments, the apparatus includes a transmitter that transmits information that initiates a transition to the connected state in response to determining to transition to the connected state.

In one embodiment, the processor determines to transition to the connected state in response to the time being greater than a predetermined time. In a further embodiment, the processor determines to remain in an inactive state in response to the time being less than a predetermined time.

A method for determining to transition to a connected state, in one embodiment, includes determining a time to wait to receive system information. In some embodiments, the method includes determining whether to transition to a connected state based on the time. In various embodiments, the method includes transmitting information that initiates a transition to the connected state in response to determining to transition to the connected state.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
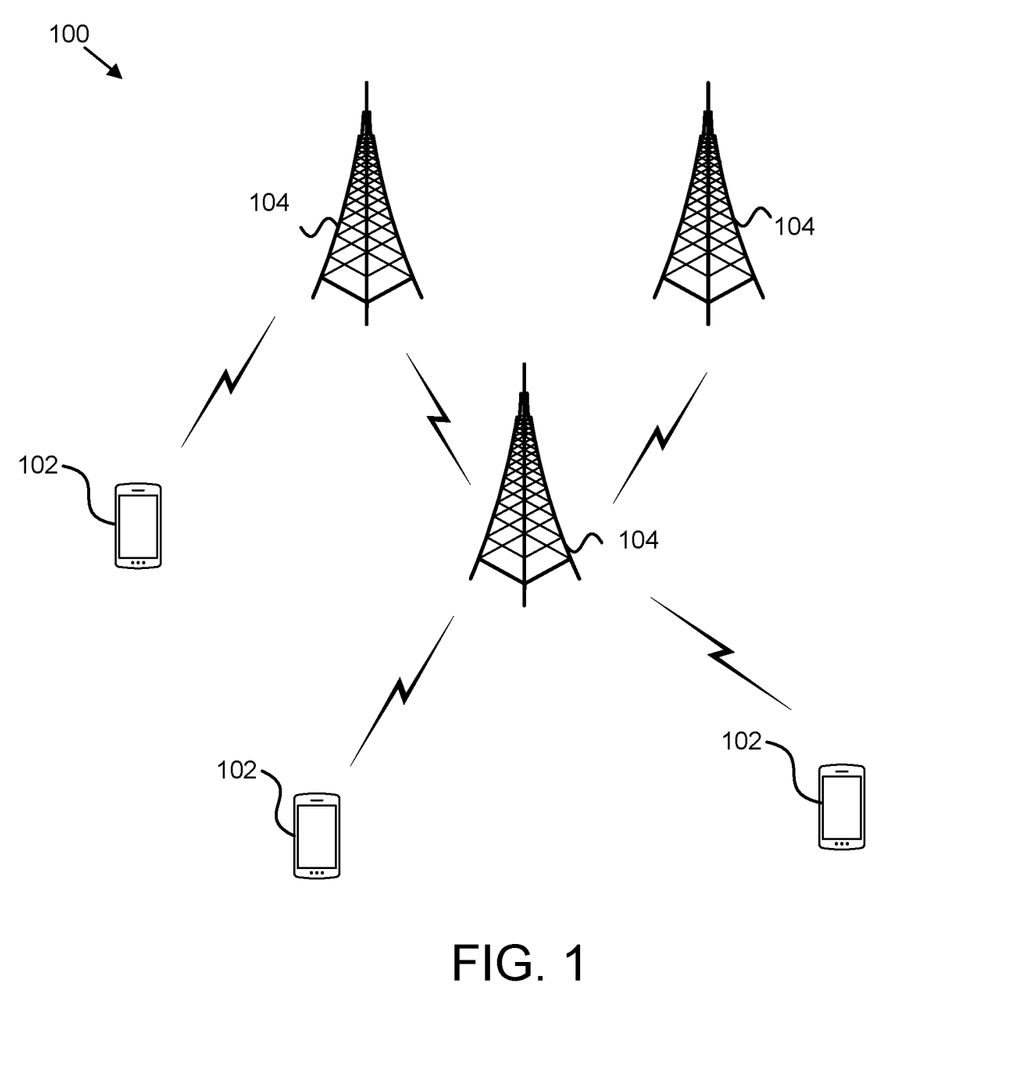
FIG. 1 is a schematic block diagram illustrating one embodiment of a wireless communication system for determining to transition to a connected state.

FIG. 1 depicts an embodiment of a wireless communication system 100 for determining to transition to a connected state. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE protocols standardized in 3GPP, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine whether to transition to a connected state for receiving system information based on a parameter associated with the system information. In various embodiments, the remote unit 102 may transmit information that initiates a transition to the connected state in response to determining to transition to the connected state. Accordingly, a remote unit 102 may be used for determining to transition to a connected state.

In another embodiment, a remote unit 102 may determine a time to wait to receive system information. In some embodiments, the remote unit 102 determines whether to transition to a connected state based on the time. In various embodiments, the remote unit 102 transmits information that initiates a transition to the connected state in response to determining to transition to the connected state. Accordingly, a remote unit 102 may be used for determining to transition to a connected state.

Figure 2:
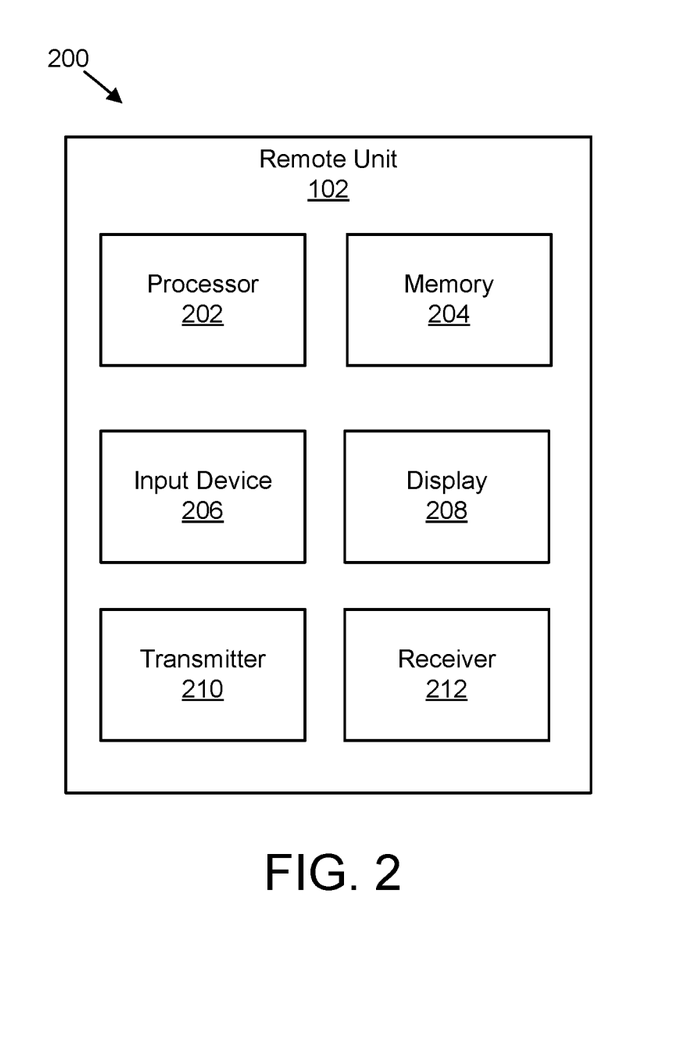
FIG. 2 is a schematic block diagram illustrating one embodiment of an apparatus that may be used for determining to transition to a connected state.

FIG. 2 depicts one embodiment of an apparatus 200 that may be used for determining to transition to a connected state. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines whether to transition to a connected state for receiving system information based on a parameter associated with the system information. In certain embodiments, the processor 202 determines a time to wait to receive system information and determines whether to transition to a connected state based on the time. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system information. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmit information that initiates a transition to the connected state in response to determining to transition to the connected state. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
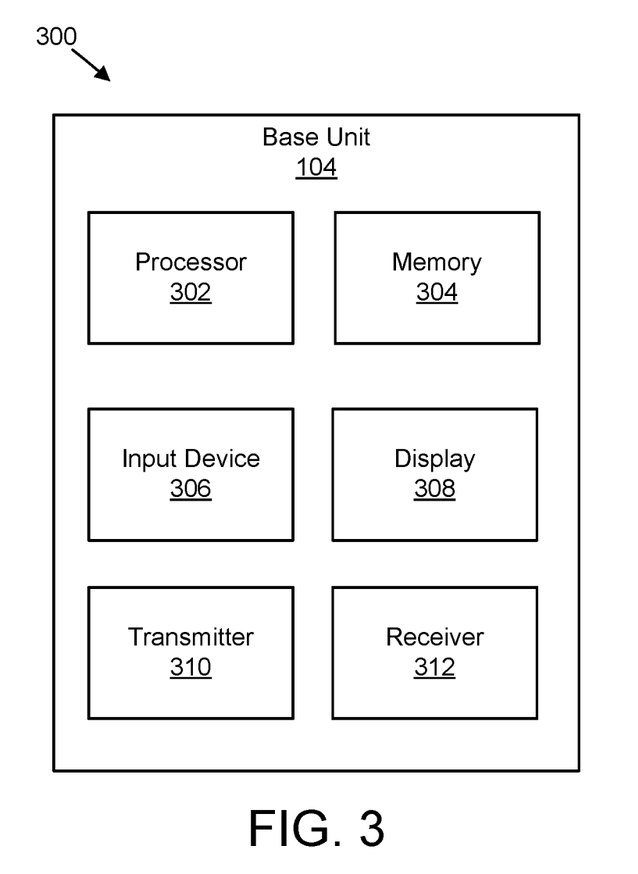
FIG. 3 is a schematic block diagram illustrating one embodiment of an apparatus that may be used for transmitting system information.

FIG. 3 depicts one embodiment of an apparatus 300 that may be used for transmitting system information. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may be used to transmit system information. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
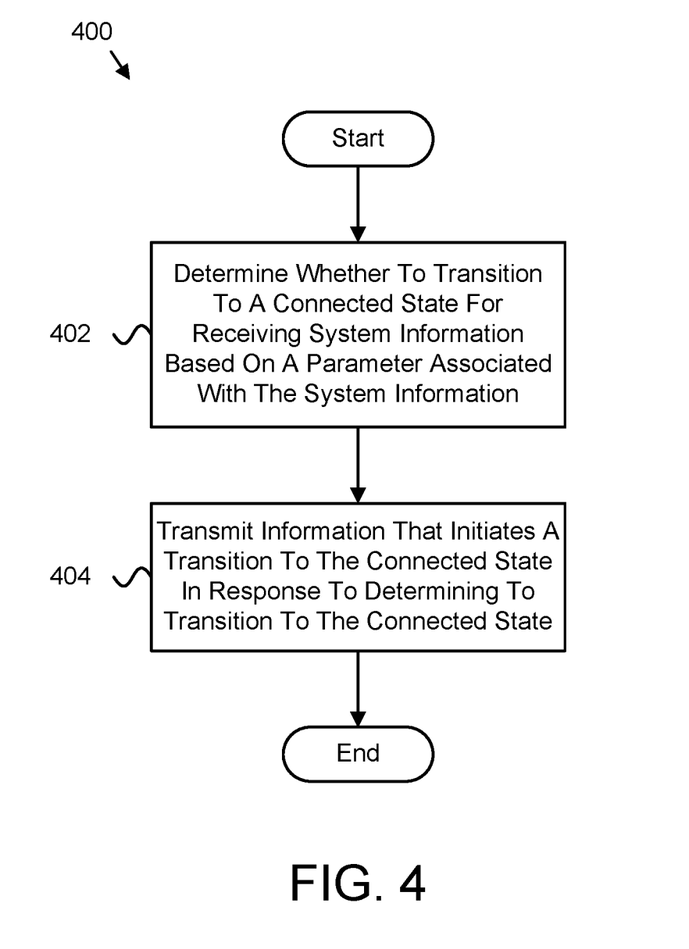
FIG. 4 is a schematic flow chart diagram illustrating one embodiment of a method for determining to transition to a connected state.

FIG. 4 is a schematic flow chart diagram illustrating one embodiment of a method 400 for determining to transition to a connected state. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 whether to transition to a connected state for receiving system information based on a parameter associated with the system information. In various embodiments, the method 400 includes transmitting 404 information that initiates a transition to the connected state in response to determining to transition to the connected state.

In one embodiment, the parameter associated with the system information includes a radio characteristic, a volume of system information, particular system information, or some combination thereof. In certain embodiments, the system information includes pathloss or other measurements over one or more downlink reference signals. In various embodiments, a remote unit 102 may determine based on its radio characteristics (e.g., like pathloss and other radio measurements) whether the remote unit 102 is to stay in an inactive state and request desired SIBs that are not regularly broadcast (e.g., provided on-demand) while in the inactive state, or whether the remote unit 102 is to transition to a connected state (e.g., RRC connected) and request the desired SIBs that are not regularly broadcast (e.g., provided on-demand) while in the connected state. As used herein, an inactive state may refer to RRC idle and/or RRC inactive.

In various embodiments, the method 400 may include determining to transition to the connected state in response to the radio characteristic being below a predetermined threshold and to remain in an inactive state in response to the radio characteristic being above the predetermined threshold. In some embodiments, the predetermined threshold is configured by minimum system information. In certain embodiments, the method 400 may include determining to transition to the connected state in response to the radio characteristic being above a predetermined threshold and to remain in an inactive state in response to the radio characteristic being below the predetermined threshold.

In some embodiments, the determination based on the radio characteristics (e.g., pathloss and/or other radio measurements) may be facilitated and/or controlled by the base unit 104 using the predetermined threshold. For example, if the pathloss is below a certain pathloss threshold then the remote unit 102 may initiate transition to a connected state. In various embodiments, thresholds for other measurement parameters may also be used. In some embodiments, the thresholds may be configured by the base unit 104 using, for example, minimum system information which may be regularly broadcasted.

In certain embodiments, the method 400 may include determining to transition to the connected state in response to the volume of system information being above a predetermined threshold and to remain in an inactive state in response to the volume of system information being below the predetermined threshold. In some embodiments, the volume of system information corresponds to a number of system information blocks, a number of system information messages, or some combination thereof.

In some embodiments, a remote unit 102 transitions to a connected state if a volume of required SIBs is greater than a predetermined threshold. The volume may be estimated using a number of required SIBs and/or a number of SIs containing required SIBs. The volume may be greater than the predetermined threshold if the number of required SIBs is greater than a threshold and/or if the number of SIs containing required SIBs is greater than a threshold.

In various embodiments, the method 400 may include determining to transition to the connected state in response to the particular system information indicating system information blocks that are to be delivered in the connected state. In certain embodiments, a base unit 104 may indicate that some specific SIBs are only to be delivered in a dedicated manner to a remote unit 102 that is in the connected state. In some embodiments, the base unit 104 may determine that SIBs are to be delivered in the dedicated manner to a remote unit 102 in the connected state if the base unit 104 wants to check to know how many remote units 102 use an SIB or if an SIB is too big to be broadcast.

Figure 5:
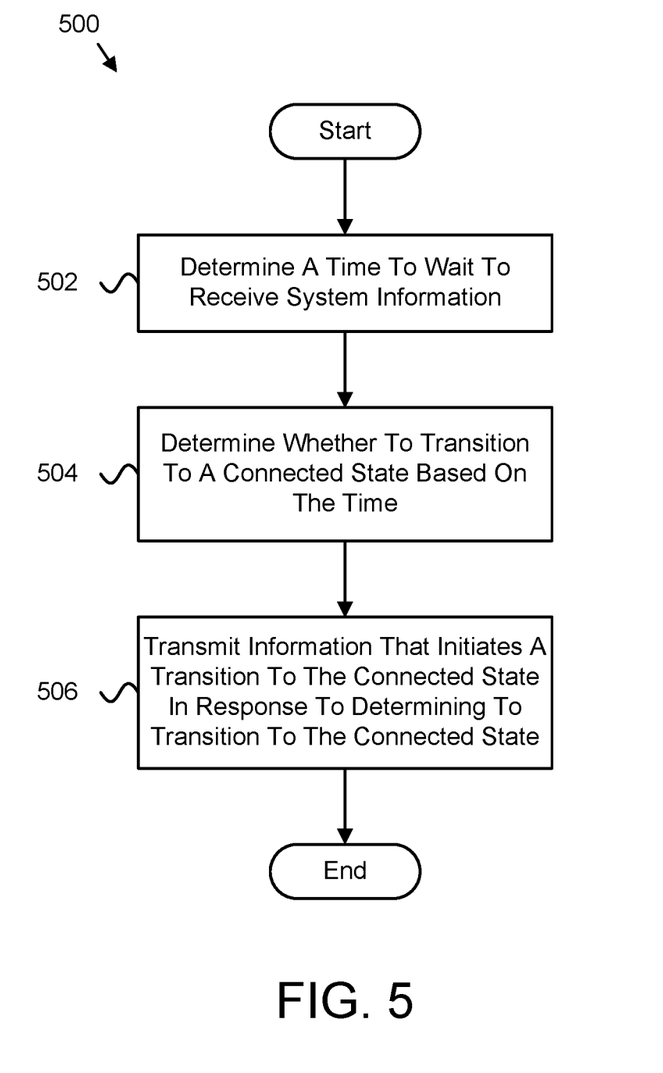
FIG. 5 is a schematic flow chart diagram illustrating another embodiment of a method for determining to transition to a connected state.

FIG. 5 is a schematic flow chart diagram illustrating another embodiment of a method 500 for determining to transition to a connected state. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a time to wait to receive system information. In some embodiments, the method 500 includes determining 504 whether to transition to a connected state based on the time. In various embodiments, the method 500 includes transmitting 506 information that initiates a transition to the connected state in response to determining to transition to the connected state.

In one embodiment, the method 500 may include determining to transition to the connected state in response to the time being greater than a predetermined time. In a further embodiment, the method 500 may include determining to remain in an inactive state in response to the time being less than a predetermined time.

In certain embodiments, a base unit 104 may broadcast certain SIBs with higher periodicities to preserve its DL resources. In various embodiments, certain remote units 102 may desire to receive one or more such SIBs urgently (e.g., the remote unit 102 cannot wait until the scheduled broadcast opportunity for the one or more SIBs. In some embodiments, examples of such SIBs may be public safety specific SIBs, vehicular communication specific SIBs, emergency specific SIBs (e.g., earthquake and tsunami warning system "ETWS", commercial mobile alert system "CMAS", etc.), and so forth. In certain embodiments, a remote unit 102 may initiate transition to a connected state (e.g., RRC connection establishment) and request the required SIBs upon successful transition to the connected state. In various embodiments, the remote unit 102 may request desired SIBs as part of initiation to transition to the connected state (e.g., using a new establishment cause, PRACH resource, etc.).

In some embodiments, the determination of whether a remote unit 102 should initiate transition to a connected state or remain in an inactive state and wait to acquire an SIB may depend on a "wait time" (e.g., time to wait). One embodiment of a wait time is illustrated in FIG. 6.

Figure 6:
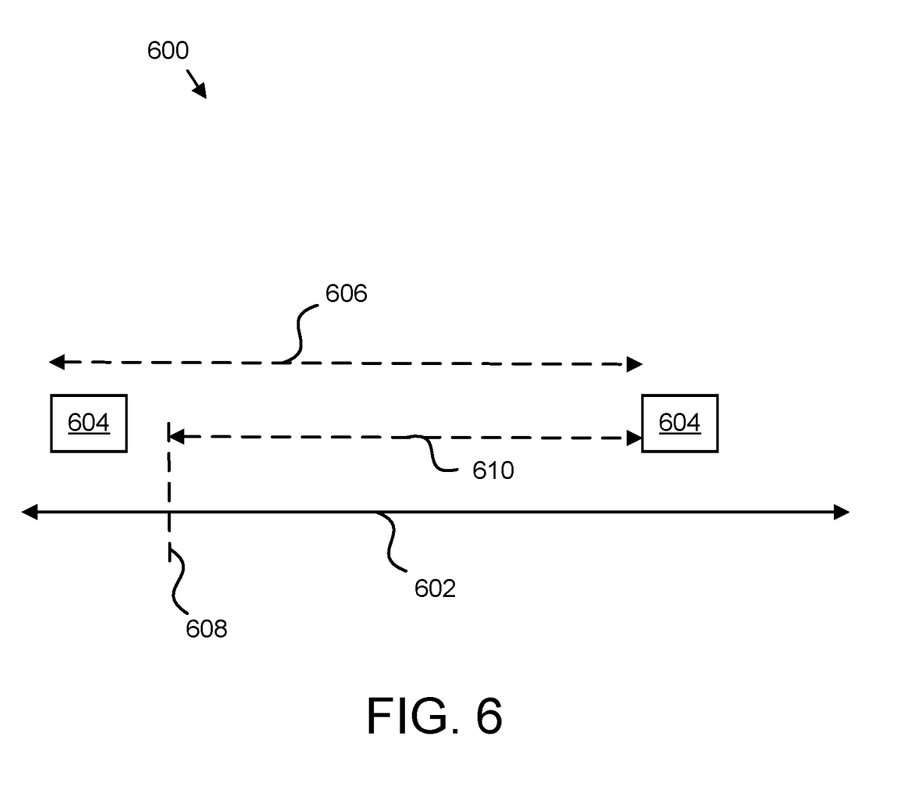
FIG. 6 is a schematic block diagram illustrating one embodiment of communications including a wait time.

FIG. 6 is a schematic block diagram illustrating one embodiment of communications 600 including a wait time. Specifically, a time 602 is illustrated, and an SIB 604 is illustrated as being transmitted over certain time periods with a periodicity 606 being a time from the start of a first transmission of the SIB 604 to the start of a second transmission of the SIB 604. A remote unit 102 may desire to obtain the SIB 604 at a time 608 that is between the first and second transmissions of the SIB 604. In one embodiment, a wait time 610 is a time between the time 608 at which the remote unit 102 desires to obtain the SIB 604 and a time at which the next transmission of the SIB 604 occurs. In another embodiment, the wait time may be the periodicity 606 time or may have a maximum of the periodicity 606 time. In various embodiments, the wait time may be determined by determining a time from the time 608 until the start of a next periodicity 606 for the SIB. In other embodiments, the wait time may be determined by determining a time from the time 608 until the end of a next periodicity 606 for the SIB. In some embodiments, the wait time may be determined by determining an average of a time from the time 608 until the start of a next periodicity 606 for the SIB and a time from the time 608 until the end of a next periodicity 606 for the SIB. In certain embodiments, the wait time may be determined by determining a number of repetitions that the remote unit 102 may need to obtain the SIB. For example, certain remote units 102 may need multiple repetitions of the same SIB to be able to successfully receive the SIB. In such embodiments, the wait time may be determined based on the number of repetitions and the periodicity 606.

In some embodiments, if the wait time 610 is longer than a predetermined wait time, then the remote unit 102 may initiate transition to a connected state. In various embodiments, the predetermined wait time may be approximately the time it takes to transition to the connected state.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that determines whether to transition to a connected state for receiving system information based on a parameter that is:
calculated based on radio characteristics of radio signals that carry the system information;
a volume of system information, wherein the processor determines to transition to the connected state in response to the volume of system information being above a predetermined threshold and to remain in an inactive state in response to the volume of system information being below the predetermined threshold;
particular system information indicating system information blocks that are to be delivered in the connected state; or
a combination thereof; and
a transmitter that transmits information that initiates a transition to the connected state in response to determining to transition to the connected state.

2. The apparatus of claim 1, wherein the system information comprises pathloss or other measurements over one or more downlink reference signals.

3. The apparatus of claim 1, wherein the processor determines to transition to the connected state in response to the radio characteristic being below a predetermined threshold and to remain in an inactive state in response to the radio characteristic being above the predetermined threshold.

4. The apparatus of claim 3, wherein the predetermined threshold is configured by minimum system information.

5. The apparatus of claim 1, wherein the volume of system information corresponds to a number of system information blocks, a number of system information messages, or some combination thereof.

6. A method comprising:
determining whether to transition to a connected state for receiving system information based on a parameter that is:
calculated based on radio characteristics of radio signals that carry the system information;
a volume of system information, wherein the processor determines to transition to the connected state in response to the volume of system information being above a predetermined threshold and to remain in an inactive state in response to the volume of system information being below the predetermined threshold;
particular system information indicating system information blocks that are to be delivered in the connected state; or
a combination thereof; and
transmitting information that initiates a transition to the connected state in response to determining to transition to the connected state.

7. The method of claim 6, wherein the system information comprises pathloss or other measurements over one or more downlink reference signals.

8. The method of claim 6, further comprising determining to transition to the connected state in response to the radio characteristic being below a predetermined threshold and to remain in an inactive state in response to the radio characteristic being above the predetermined threshold.

9. The method of claim 8, wherein the predetermined threshold is configured by minimum system information.

10. The method of claim 6, wherein the volume of system information corresponds to a number of system information blocks, a number of system information messages, or some combination thereof.

11. An apparatus comprising:
a processor that:
determines a time to wait to receive system information based on a scheduled transmission periodicity of the system information;
determines whether to transition from an inactive state to a connected state based on the time; and
determines to transition from the inactive state to the connected state in response to the time being greater than a predetermined time; and
a transmitter that transmits information that initiates a transition from the inactive state to the connected state in response to determining to transition to the connected state.

12. The apparatus of claim 11, wherein the processor determines to remain in the inactive state in response to the time being less than a predetermined time.

13. A method comprising:
determining a time to wait to receive system information based on a scheduled transmission periodicity of the system information;
determining whether to transition from an inactive state to a connected state based on the time;
determining to transition from the inactive state to the connected state in response to the time being greater than a predetermined time; and
transmitting information that initiates a transition from the inactive state to the connected state in response to determining to transition to the connected state.

14. The method of claim 13, further comprising determining to remain in the inactive state in response to the time being less than a predetermined time.

\* \* \* \* \*